United States Patent
Breuer et al.

(10) Patent No.: US 10,009,887 B2
(45) Date of Patent: Jun. 26, 2018

(54) METHOD FOR ESTIMATION OF DATA THROUGHPUT OF A WIRELESS DEVICE OPERATED IN A CELLULAR NETWORK

(71) Applicant: GEMALTO M2M GMBH, Munich (DE)

(72) Inventors: Volker Breuer, Boetzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 0 days. days.

(21) Appl. No.: 15/317,659

(22) PCT Filed: May 11, 2015

(86) PCT No.: PCT/EP2015/060294
§ 371 (c)(1),
(2) Date: Dec. 9, 2016

(87) PCT Pub. No.: WO2015/188996
PCT Pub. Date: Dec. 17, 2015

(65) Prior Publication Data
US 2017/0127387 A1    May 4, 2017

(30) Foreign Application Priority Data

Jun. 11, 2014    (EP) .................................... 14172001

(51) Int. Cl.
*H04W 4/00*    (2018.01)
*H04W 72/04*    (2009.01)
(Continued)

(52) U.S. Cl.
CPC ........ *H04W 72/042* (2013.01); *H04B 17/318* (2015.01); *H04J 13/00* (2013.01);
(Continued)

(58) Field of Classification Search
CPC ........... H04W 72/042; H04W 72/0446; H04W 72/0473; H04W 4/70; H04W 4/005; H04B 17/318; H04J 13/00; H04J 13/12
(Continued)

(56) References Cited

U.S. PATENT DOCUMENTS 6,748,220 B1 *  6/2004  Chow .................. H04W 72/08
                                                       455/450
9,907,088 B2 *  2/2018  Park .................. H04W 72/1257
(Continued)

FOREIGN PATENT DOCUMENTS

EP        1 227 692 A1    7/2002

OTHER PUBLICATIONS

International Search Report (PCT/ISA/210) dated Jun. 17, 2015, by the European Patent Office as the International Searching Authority for International Application No. PCT/EP2015/060294.
(Continued)

*Primary Examiner* — Thai Hoang
(74) *Attorney, Agent, or Firm* — Buchanan Ingersoll & Rooney PC

(57) ABSTRACT

A method for operating a wireless device within a cellular network having at least two base nodes and providing common channels and at least one downlink non-common channel. The wireless device decodes at least one common channel and the downlink non-common channel, and performs the steps of determining a value relative to the total amount of resources provided by one of the base nodes, determining a value relative to the amount of resources provided by the one base node for the common channels out of the total resources, determining a value relative to the amount of resources suitable of being received by the wireless device, calculating the share of usable resources in comparison to said total resources excluding common
(Continued)

resources, and adapting the operation of the wireless device within the cellular network in dependence of the calculated share of usable resources.

15 Claims, 4 Drawing Sheets

(51) Int. Cl.
| | |
|---|---|
| *H04J 13/00* | (2011.01) |
| *H04J 13/12* | (2011.01) |
| *H04B 17/318* | (2015.01) |
| *H04W 4/70* | (2018.01) |

(52) U.S. Cl.
CPC ............. *H04J 13/12* (2013.01); *H04W 4/005* (2013.01); *H04W 4/70* (2018.02); *H04W 72/0446* (2013.01); *H04W 72/0473* (2013.01)

(58) Field of Classification Search
USPC ........ 370/229–238, 328–330, 341–345, 347, 370/436–437, 478
See application file for complete search history.

(56) References Cited

U.S. PATENT DOCUMENTS

| | | | | |
|---|---|---|---|---|
| 2008/0123600 | A1* | 5/2008 | Fodor | ................ H04W 72/044 370/335 |
| 2013/0100933 | A1* | 4/2013 | Kim | .................... H04W 52/367 370/335 |

OTHER PUBLICATIONS

Written Opinion (PCT/ISA/237) dated Jun. 17, 2015, by the European Patent Office as the International Searching Authority for International Application No. PCT/EP2015/060294.

Intel Corporation: "On Resource Allocation for D2D Discovery", 3GPP Draft; R1-140133-Intel-Discovery Resource Allocation, $3^{rd}$ Generation Partnership Project (3GPP), Mobile Competence Centre; 650, Route Des Lucioles; F-06921 Sophia-Antipolis Cedez; France, vol. RAN WG1, No. Prague, Czech Replublic; Feb. 10, 2014-Feb. 14, 2014, XP050751812, retrieved from the internet: URL http://www.3gpp.org/ftp/tsg_ran/WG1_RL1/TSGR1_76/Docs/.

* cited by examiner

METHOD FOR ESTIMATION OF DATA THROUGHPUT OF A WIRELESS DEVICE OPERATED IN A CELLULAR NETWORK

FIELD OF THE INVENTION

The present invention relates to a method for operating a wireless device operated within a cellular network.

The invention also pertains to a wireless device using aid method.

BACKGROUND OF THE INVENTION

Generally it is known in the art that a wireless device operated within a cellular network is configured to request an amount of resources from the cellular network, respectively its base node, when it is about to launch a data reception session. Depending upon the scheduling rules of the cellular network, the wireless device gets assigned all the requested resources, a part of the requested resources or none of them.

In particular in the field of machine-to-machine (M2M) communication it is for special types of devices of high importance to know about the serving base nodes current capabilities, in case the requested resources are not or not fully assigned. It is hence of interest if the serving base node is capable to provide the requested amount of resources at other times, or if it is as such not able to provide the requested amount of resources. For wireless devices conducting M2M communication this makes a difference, as for each situation different options can be chosen to react on such situations.

By now it is known in cellular networks supporting 3G wireless technology standard (3G networks) that the wireless device provides to the cellular network an indication on the channel quality via the channel quality indicator (CQI). Based on this value the cellular network resp. the serving base node is able to modify its scheduling for many concurrent wireless devices in the cell assigned to the serving base node. The disadvantage of this channel quality indicator is, that there is likelihood that all wireless devices assigned to one base node provide the same value of the channel quality indicator. However, through the scheduling mechanism of the cellular network resp. its base node the wireless devices get in response different throughput amounts assigned. This shows that the wireless device has no special means to know if the serving base node is capable to provide a certain amount of resources or influence the scheduling according to the needs.

It is therefore a goal of this invention for the wireless device to derive the most appropriate operation mode within the cellular network taking into account the receivable throughput in conjunction with base nodes from the cellular network.

Further alternative and advantageous solutions would, accordingly, be desirable in the art.

SUMMARY OF THE INVENTION

The present invention aims at solving addressed problem by a method to operate a wireless device according to claim 1.

The present invention also relates to a wireless device configured to execute said method according to claim 10.

It is therefore according to the first aspect of the invention proposed a method for operating a wireless device operated within a cellular network, the cellular network comprising at least one radio network, comprising at least two base nodes, each base node being configured to establish a connection between the cellular network and the wireless device, the radio network further being configured to provide a channel structure comprising common channels and at least one downlink non-common channel, and a specific amount of resources available for said channels at each of the base nodes, the wireless device operating within the cellular network with resources received from one of the base nodes, hereinafter the serving base node, the wireless device being further configured to decode at least one common channel and the at least one downlink non-common channel, comprising the steps of, for the wireless device:
determining a value relative to the total amount of resources provided by the serving base node, hereinafter total resources,
determining a value relative to the amount of resources provided by the serving base node for the common channels out of the total resources, hereinafter common resources,
determining a value relative to the amount of resources suitable of being received by the wireless device, hereinafter usable resources,
calculating the share of usable resources in comparison to said total resources excluding common resources,
adapting the operation of the wireless device within the cellular network in dependence of the calculated share of usable resources.

According to this method a wireless device is operating within a cellular network assigned to one out of a plurality of base nodes, being part of a radio network (RAN). The one base node where the wireless device is in association with is called from the wireless device's perspective the serving base node. The serving base node is depending on the wireless technology standard a base station, a nodeB or an eNodeB. The wireless device is assigned to such serving base node by way of camping on the cell in idle state, being in connected state or—in 3G networks—in Cell-FACH (Forward access channel), in Cell-PCH (Cell Paging channel) or URA-PCH (UTRAN (UMTS Terrestrial Radio Access network) registration area-paging channel) state.

The radio network of the cellular network is further configured that way that it provides a certain channel structure. According to wireless technology standards each technology has defined a couple of channels, either physical or logical, whereby the logical channels are typically mapped on physical channels.

The channels get assigned a specific amount of resources available at each of the base nodes. The amount of resources is at least specific to each base node. That means, if a certain amount of wireless devices is registered to one base node and is using all of its resources, an additional wireless device requesting registration with this base node would be rejected from the base node. The same applies to already registered wireless devices allocating resources assigned to said channels in terms of communication purposes. If these resources are fully allocated to other wireless devices, the request for another resource in order to perform a communication would also be rejected.

One group of channels are so called common channels, these are those channels who are not dedicated to one or a few wireless devices but are receivable for all wireless devices assigned to the cell of the radio network and being in a certain state. This is in particular the case for broadcasting channels. One example of such common channels is for 3G networks the Common Pilot Channel CPICH, that is decoded by wireless devices at the beginning of the registration process.

The other group are the non-common channels, in particular downlink non common channels. These are channels that are not decoded by all wireless devices assigned to the respective base node of the radio network in a certain state. One variant of those non-common channels are dedicated channels, that are only intended for one wireless device. To this group typically belong channels who indicate any data being useful and intended for the addressed wireless device.

Another variant is the group of so called shared channels that are decoded by more than one wireless device, but still not all wireless devices assigned to the respective base node of the radio network in a certain state. Such channels are in particular downlink user data channels, where each wireless device picks the packets assigned to them.

The wireless device is configured to conduct the steps described below, whereby the determination steps can be executed in arbitrary succession. Also it is not defined if additional steps are executed in the meantime between two of the steps, and if one or each of the steps are carried out as one step or a chain of several steps.

The first determination step includes determining a value relative to the total amount of receivable resources provided by the serving base node for a wireless device, hereinafter total resources.

Such total resources can include all such resources that are available at the cell resp. the serving base node. It can further include those resources that are available for a wireless device to be assigned as part of a non-common channel. Finally the total resources can include those resources that are actually received by at least one wireless device in the current cell, including the resources assigned to the respective wireless device itself.

It is arbitrary how this total resources value is determined. Typically a measurement is provided by nowadays baseband chips, hence the total resources value can be directly derived. In another alternative such determination step can be designed in that two or more other values are measured and the total resources value is derived, in particular by summing up the two or more other measured values.

It is additionally to be mentioned that this total resources value is observed from the respective wireless devices perspective. As such it is also possible that the measured values relative to the total resources value include additional resources due to interferences, in particular data sent from a base node of a neighboring cell. Hence the total resources value from the wireless devices perspective might be larger than the total resources value from the serving base nodes perspective.

The second determination step includes determining a value relative to the amount of resources provided by the serving base node for common channels out of the total resources.

For that it is advantageous to measure the amount of resources used for the common channels. These common resources are part of the total resources of the serving base node. As the common channels are transmitted by the serving base node irrespective of the amount of wireless devices assigned to the serving base node, it is to assume that the common resources are quasi constant over a given time period. Therefore it is also envisaged—and thus seen as part of the invention—that the determination of the common resources is conducted at an earlier time and stored within a memory unit of the wireless device in order to retrieve the stored value when one of the other measurements is performed. The stored determined common resources can be assumed as being constant as long as the wireless device camps on the same cell, that means that it is connected to the same base node.

The third determination step includes determining a value relative to the amount of resources suitable of being received by the wireless device, hereinafter usable resources. To receive such resources in particular means to decode such resources respectively the channels based on those resources.

This amount of resources can comprise the dedicated resources assigned to the respective wireless device if it is in connected state. It can further comprise resources assigned to shared channels, so called shared resources, received from the wireless device, irrespective of the state.

Said shared resources can be assigned in connected mode and in 3G networks in addition in Cell-FACH state. Furthermore the wireless device can distinguish for certain shared resources whether to include them in usable resources or rather into non-usable resources, like for Multimedia Broadcast Multicast Service (MBMS) in case of single-to-multipoint-transmission in downlink. For the wireless device such type of resources can be considered as not available resp. usable in said service. This is due to that this service may not be stopped and consume the same amount of resources ever since and appear as not being ready to be used for dedicated channels.

Additionally the usable resources can also comprise the available resources of the serving base node which are those resources that are not yet assigned. Provided a direct or indirect measurement is available this can give an indication of the potential amount of resources that the serving base station has on stock to be provided to the respective wireless device. Effectively said resources are considered as being suitable if the wireless device currently receives resp. decodes them now—alone or with others—or in the future.

In the next step it is now—based on the determined values—calculated which share the usable resources have in relation to the total resources, excluding common resources. It is to be noted that it is also part of the invention, that the total resources have already at determination time deducted the common resources.

With the calculated share the wireless device has now information about what amount of total resources is already assigned to the wireless device and/or is available to be assigned.

Depending upon the planned reception task, e.g. a firmware update, the wireless device can now make a much better estimation about what additional resources could be assigned when the reception task is started.

As reaction the wireless device can adapt its operation within the cellular network in dependence of the calculated share of usable resources.

If the share value is already very high, and the wireless device detects that the current data throughput is merely sufficient for the planned task, then the wireless device knows that to wait within this cell will not solve the performance issue. So, other measures have to be taken, in order to execute this task in an acceptable data throughput range.

Further—when the available resources are taken into account as well—it can be estimated the share of resources assigned to other wireless devices. If this share is rather high the wireless device knows, that—opposed to the situation sketched before—it is quite likely that an acceptable data throughput can be achieved at another, less congested time.

In case the wireless device is operating in a non-connected state, this can further mean that only the available resources, without any resources actually assigned to the respective wireless device, are considered for the usable resources.

Through the suggested method the wireless device is set into the position to take appropriate steps for adapting the operation within the cellular network based on a much wider knowledge with respect to the serving base node conditions.

In a further preferred embodiment it is proposed a method characterized in that the cellular network comprises a radio network based on cellular code division multiple access method, wherein the resources being those related to power of respective channels.

According to this method the described steps are applicable to radio networks supporting code division multiple access methods (CDMA), which is the basis for radio networks supporting wideband CDMA (W-CDMA), CDMA2000, 1×RTT, and others, typically summarized under the abbreviations UMTS or 3G networks.

Those 3G networks are characterized in that at the same time on the same frequency multiple channels can be transmitted, by spreading each signal over the available frequency band of typically 5 Mhz (for WCDMA). The critical resource for each channel of a base node (nodeB for 3G networks), and hence for each operated wireless device, is the signal power of the respective channel. Therefore in order to determine the data throughput it is paramount for a wireless device to know which signal power is available at the serving base node and can be used for the wireless devices purposes.

In a further preferred embodiment it is proposed for the determination steps for wireless devices operating in a 3G network in connected mode:
  the step of determining total resources comprising measuring the received wideband power,
  the step of determining common resources comprising determining the amount of received power of the common channel, and/or
  the step of determining usable resources comprising measuring the power of received dedicated channels assigned to the wireless device.

According to this embodiment the received power relative to the respective channels channels is to be determined. For the first step of determining the total resources it is in 3G networks suggested to measure the received wideband power related to the serving base node. According to TS 25.215 the received wide band power corresponds to the UTRA Carrier RSSI. This is according to the wireless technology standard the received wide band power including thermal noise and noise generated in the receiver, within the bandwidth defined by the receiver pulse shaping filter. The reference point for the measurement shall be the antenna connector of the wireless device.

In the second step of determining common resources it is suggested to determine the amount of power of the common channels that is received at the respective wireless device. As set out before the common channels are those that are dedicated to be received by all wireless devices assigned to a certain base node. As the common channels are sent independent of the amount of wireless devices listening to them, the received power of the common channel is not a function of the amount of wireless devices currently camping on the respective base node. It is moreover assumed as being rather constant. Due to that it is advantageous to execute this determination step only once when the wireless device is camping on a cell, or at least execute it independently of the other determination steps, in particular way before executing those steps.

Finally the usable resources are determined, preferably by measuring the power of the received dedicated channels assigned to the wireless device. One preferred possibility to conduct this determination step is by measuring all received channels, then excluding the power of the received common channels. The remainder forms the usable resources.

Usable resources in this sense mean the power resources currently in use for the respective wireless device. Based on that in the calculation step it can be figured out a ratio or share between the usable resources and the total resource (minus common resources). This share shows, if an increase of usable resources is possible. If the share is close to 100%, it is clear that a further increase is technically not possible.

In another sense the usable resources are understood as those resources that can be assigned to the wireless device. This is in particular true for situations where the wireless device is not yet operating in connected mode, and hence no dedicated channels are available. Yet it is of interest if the wireless device will be able to get a fair share of the totally available resources. Should a remarkable amount of the total resources are already assigned to other wireless devices, the share of usable resources will be rather low, at least for the moment.

With this embodiment it is possible for wireless devices operating in 3G networks to derive the share of resources for own purposes based on available signal power measurements.

In another embodiment it is suggested a method characterized in that the cellular network comprising a radio network being adapted for coding communication signals in a link related to the wireless device by means of an orthogonal division frequency and/or time division multiple access, wherein the resources being those related to resource unit.

In accordance with this embodiment it is also possible to implement the inventive method in that way that a wireless device operating in 4G networks can take advantage of it. 4G networks support the wireless technology standard named LTE (Long term evolution) and variants thereof, like LTE advanced, LTE light etc. For 4G networks it is proposed to determine as resources the resource units.

Within LTE the smallest units to be transmitted are symbols representing the amount of data to be handled within one transmission step of 66,667 microseconds depending on the modulation. Those symbols are called resource element and hence represents one type of said resource unit. Another type of resource units are the so called resource blocks. Such a resource block is the aggregation of seven symbols on 12 sub carriers, and represents the data to be handled within one slot of 0.5 milliseconds. Further an additional aggregation level in subframes is designed within 4G, which can also be understood as a resource unit in the sense of this embodiment.

In another embodiment it is suggested a method characterized in that the cellular network comprising a radio network based on a cellular global system for mobile communications, wherein the resources being those related to time slots.

In accordance with this embodiment it is moreover possible to implement the inventive method in that way that a wireless device operating in 2G resp. GSM networks can take advantage of it. Within 2G networks the channels are divided in time slots, therefore this is the key resource of this type of radio networks. The inventive method is hence also applicable to the GSM area.

Consequently for the determination steps the total resources can directly be derived by the timeslots of one frame. Furthermore it is advantageously if as total resources only those time slots are calculated that can in theory be assigned to one wireless device.

It is to be said that nowadays wireless devices are typically equipped that way that if they are capable of supporting a higher wireless technology standard, the lower standard(s) are also enclosed. That is to say that a LTE capable wireless device usually supports also 2G and 3G networks.

Having that said it is also encompassed that one wireless device which supports more than one wireless technology standard, is configured to operate within these radio networks in that way that one of said embodiment relative to a certain wireless technology standard is conducted dependant on the radio network the wireless device is currently operating in.

In a further advantageous embodiment it is proposed a method further comprising the step of determining data throughput of a transmission operation for a given time period by calculating the usable resources compared to the total resources.

Taking into account the average reception conditions i.e. carrier-to-interference ratio (C/I) average the wireless device is even in the position to derive from the amount of resources the maximum expected throughput, the actual achieved throughput is known anyway. For that the actual achieved throughput for a given time period can be determined.

In simplest case the current throughput for the time period and the current amount of resource can be set into ratio to the maximum available resources and hence the maximum achievable throughput can be estimated.

This allows a wireless device, in particular a machine-to-machine device that plans to receive a certain downlink data transmission, to calculate the time that is required for the planned operation, provided the size of the data in question is known. This further helps to decide if the planned operation is appropriate at this time in this cell of this radio network.

It is further advantageous that the given time period is increased, wherein the data throughput calculation represents an averaged representative of the data throughput. For a longer data transmission session this gives a good estimation of the average throughput for the whole data transmission session.

If on the other hand the time period is decreased, the data throughput value indicates the most recent values. It is therefore advantageous to successively measure values with a short time period in order to detect frequently changing conditions. If those values exceed said averaged value for a measurement with longer time period, it can be derived that the situation is getting better. This is in particular true if there are a couple of values in a row exceeding the averaged value.

In a further advantageous embodiment it is proposed a method wherein the common channels comprising at least one pilot channel, wherein at the serving base node the share of resources spent for the pilot channel compared to the total resources being practically constant around a value hereinafter designated as constant share, the constant share further being stored within the wireless device, characterized in that if the share of the resources spent for said pilot channel compared with the total resources, both resource values determined at the wireless device, materially differing from the stored constant share, for the step of determining the value relative to the total resources:

subtracting from the determined total resources a value representing the difference between the determined share and stored constant share.

According to this embodiment the common channels comprise a pilot channel. This is in particular for 3G networks the Common Pilot Channel CPICH. Through such pilot channel a wireless device which is about to register to a base node is provided with basic information required for registration, e.g. within 3G networks scrambling codes etc.

This embodiment is based on the situation that the at least one pilot channel has a constant ratio compared to the total resources at the base node. This constant ratio value is preferably made available to the wireless device and preferably preconfigured, either from factory, or when first entering the cellular network. It is then stored in memory unit of the wireless device accessible during operation.

When at the wireless device a different ratio is determined this is an indication that interference power, e.g. from a neighbouring base node, was added to the total power. With the measured power for the common channels, in particular the pilot channel, it can now be detected to which amount the interference power is added to the measured total power.

By doing so, this interference power can be subtracted from the total power. Alternatively just the common channel power can be used by multiplication with the stored constant ratio value to receive the accurate total power.

Now the calculation of the share of usable resources compared to total resources is based on this adjusted total power value much more accurate than with a pure calculation based on the measured total power value.

In a further preferred embodiment it is proposed a method further comprising the steps of:
  determining the amount of resources provided by the serving base node for non-common channels received at a plurality of wireless devices different from the respective wireless device, hereinafter other resources,
  detecting that the resources of the serving base node being fully assigned, if the sum of usable resources and other resources equals total resources excluding common resources,
  adapting the operation of the wireless device within the cellular network further in dependence of said detecting step.

This determination step helps the wireless device to detect if the serving cell is fully occupied. That means in particular that additional resources cannot be assigned to the respective wireless device. The adaptation of the operation of the wireless device within the cellular network is strongly dependent upon such situation.

For 3G networks this in particular means that the total resources are determined by way of a derivation from the common resources, in particular the CPICH. The CPICH is defined as having one tenth of the total power available at the base node.

On the other hand it is determined the sum of usable resources and the other resources. The usable resources are the resources decoded at the wireless device, in particular s part of the dedicated channels for the wireless device.

For 3G networks the step of determining other resources comprises determining at least one power value representing the power of downlink non-common channels intended for other wireless devices operating in connection with the serving base node of the 3G network, the respective wireless device is currently in connection with. The power value for other resources can be retrieved from the total received wideband power minus the common channels and the usable resources. This means: The wireless device is able to measure the downlink power of the serving base node. For all channels the wireless device is able to decode—the common channels and those channels dedicated to the wireless device—the power values are known. The remaining received wideband power is then assigned to other devices.

Whether the resources of the cell are fully assigned can now be derived from the determined values. Preferably from the total resources the common resources are deducted, which leads to the theoretical amount of resources that can be dedicated to wireless devices. This value is compared to the sum of the usable resources and the other resources, or put differently: the sum of resources actually dedicated to wireless devices. If both values are equal, then the resources of the serving base node are fully assigned.

This equation can certainly be adapted that way, that the common resources are not deducted from the total resources, but added to the sum of usable and other resources. This would lead to the same result. Here on both sides of the equation theoretical and actual total resources are stated.

Advantageously based on this detection the adaptation of the operation of the wireless device within the cellular network can focus on such adaptations which cope with the situation of a presently fully occupied serving cell.

Consequently other adaptations are to be taken in case it is detected that the resources of the serving base node are not fully assigned.

Hence according to another preferred embodiment it is suggested a method characterized in comparing the share of usable resources with at least one preconfigured threshold value, and if that threshold value is exceeded, taking one out of the measures to adapt operation of the wireless device:
changing radio network, or
changing serving base node within the radio network, or
delaying at least one scheduled data operation with the cellular network.

According to this embodiment the adaptation of the operation of the wireless device within the cellular network comprise a group of operations which could solve the load situation of the current cell.

Generally it is a depending on the wireless devices' quality of service requirements, which of the operations is fitting best in such a situation. Preferably the selection is depending upon the kind of situations that is detected by the proposed methods.

According to that in case of not sufficient data throughput, if it is detected that the wireless device already has a remarkable share of resources within the cell assigned, it is advantageously to try change to another base node, or even try to change the current RAN to a RAN with a better throughput, or which is expected to be less loaded.

If it is detected that the wireless device has a low share, but the resources of the serving base node are at a good share assigned to other wireless devices, it is preferable to delay— if possible—the transmission session to a less congested time.

Said decision can further be based on time value with that the current throughput is calculated. If the share is an average share, other decisions can be appropriate than for successive recent shares.

Each of the operation can have different threshold, or in combination with other calculated ratio decision making is executed.

Apart from this also the situation can occur that the serving cell has more resources available than needed by the wireless device. In this case the wireless device will not take one of these measures but remain assigned to the serving base node and start the download operation.

Additionally the proposed method may also be performed in non-registered state to perform a cell and/or cellular network selection based on throughput criteria in case of roaming or improved manual cell or cellular resp. radio network selection, i.e. selecting not a predefined or manually selected specific radio network but a radio network being able to provide most resources or respective throughput.

In non-connected state having yet no usable resources the wireless device may in addition evaluate the common resources and derive from the common resources and its information the total resources. Further the method includes subtracting from those total resources the receivable resources and the common resources to derive the available resources. The receivable resources are those assigned to other wireless devices and can depending on the wireless technology standard be measured or differently deducted.

The available resources can be assumed to be available for the wireless device if the wireless device would attach to the related base node of the radio network.

In a second aspect of the invention it is proposed a wireless device configured to operate within a cellular network,
the cellular network comprising at least one radio network, comprising at least two base nodes, each base node being configured to establish a connection between the cellular network and the wireless device,
the radio network further being configured to provide a channel structure comprising common channels and at least one downlink non-common channel, and a specific amount of resources available for said channels at each of the base nodes,
the wireless device is further configured to
operate in a mode with resources received from one of the base nodes, hereinafter the serving base node, the wireless device being further configured to decode at least one common channel and the at least one downlink non-common channel,
determine a value relative to the total amount of receivable resources for the wireless device, hereinafter total resources,
determine a value relative to the amount of resources provided by the serving base node for the common channels out of the total resources, hereinafter common resources,
determine a value relative to the amount of resources suitable of being assigned to the wireless device, hereinafter usable resources,
calculate the share of usable resources in comparison to said total resources excluding common resources,
adapt the operation within the cellular network in dependence of the calculated share of usable resources.

Such wireless device according to the second aspect shares the advantages achieved with the operating method of the first aspect of the invention.

According to a further advantageous embodiment it is proposed a wireless device comprising a communication unit and communicatingly coupled a controlling appliance,
the communication unit is configured to conduct said determination steps, and to provide results of said determination steps to the controlling appliance,
the controlling appliance is configured to:
conduct said calculation step,
compare the share of usable resource with at least one preconfigured threshold value,
if the threshold value is exceeded conduct one out of the operations:
change radio network, or
change serving base node within the radio network. or
delay at least one scheduled data operation with the cellular network.

According to that the wireless device is composed of at least two components, the communication unit and the controlling appliance. The controlling appliance preferably constitutes the controlling party of the whole wireless device, implemented as application processor.

The communication unit typically is implemented as machine-to-machine (M2M) module, and has its main tasks to send and receive data or voice between the controlling appliance and the cellular network.

The controlling appliance controls also the communication with the cellular networks by a command interface to the communication unit.

Such command interface can be an AT-command interface or others, wherein either the controlling appliance sends commands to the communication unit, which handle these commands and returns the result of the operation, or the communication unit provides asynchronous information to the controlling appliance. Such asynchronous information can inform about certain events, like an incoming call or message, and is independent of commands. In AT-commands those asynchronous information are known as Unsolicited Result Code (URC), in other command interfaces such asynchronous information can be implemented as exceptions or events.

According to this embodiment of the wireless device, the communication unit is configured to conduct said determination steps and provides the results of the determination steps to the controlling appliance. In the controlling appliance now the calculation step of the share of usable resources are conducted. If a preconfigured threshold is exceeded with the calculated share, it is up to the controlling appliance to select one out of the possible operations, in particular to delay or select another cell, radio network or—if possible—even a different network operator.

This split of tasks is advantageous as the controlling appliance has all information available to rate the relevance and urgency of the pending data reception session. So a delaying for a later time can only be advised if the data are not time critical. This information is typically not available in a communication unit or would require extra efforts at the communication unit and with respect to the command interface.

Nevertheless the controlling appliance can influence the behavior of the communication unit with respect to the measurements. As basic controlling measure, the determination steps can be activated or deactivated through launching commands at the command interface. This is in particular advantageous to reduce power consumption and/or not to block operating performance of the communication unit, if the determination results are not needed.

Further the controlling appliance can influence the measurement time period to calculate the data throughput. As set out before longer vs. shorter time periods render different information about the cellular network situation. It is hence advantageous that the controlling appliance directs the communication unit which time period is used, and such to base subsequent decisions on such determination results.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
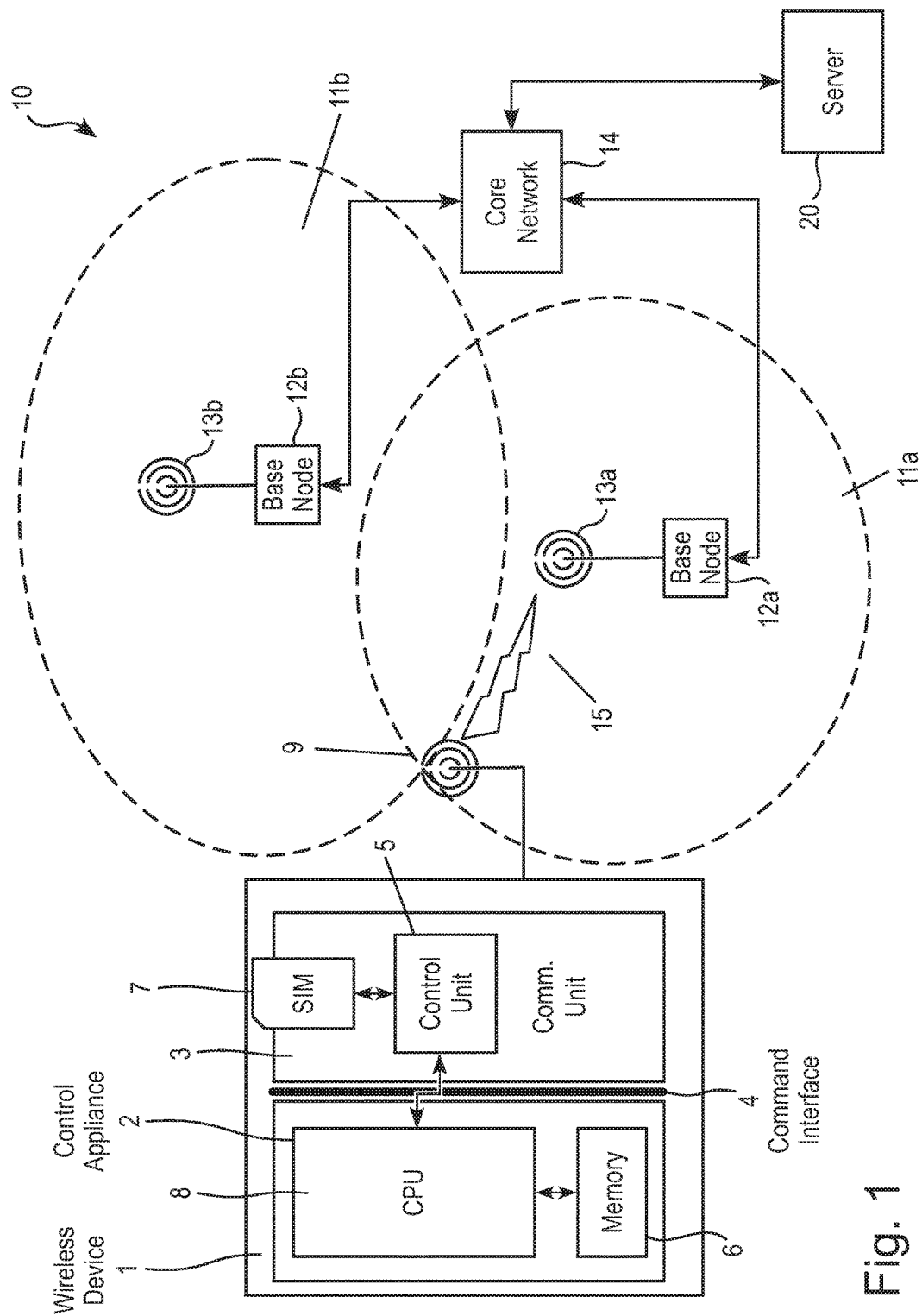
FIG. 1 represents a wireless device of the type to which the present invention is applied as an embodiment.

The same elements have been designated with the same reference numerals in the different drawings. For clarity, only those elements and steps which are useful to the understanding of the present invention have been shown in the drawings and will be described. Moreover, when an action is said to be performed by a device, it is in fact executed by a microprocessor in this device controlled by instruction codes recorded in a program memory on said device.

FIG. 1 schematically shows a wireless device of the type to which the present invention is applied as an embodiment. The wireless device 1 is in this embodiment composed of a controlling appliance 2 and a communication unit 3. The controlling appliance 2 is the active part of the wireless device 1 and can in particular comprise a user interface and/or operation software that controls the full behaviour of the wireless device 1. Such operation software, also controlling the optional user interface, is run in the central processing unit 8 of the controlling appliance 2. It further comprises a memory unit 6 for storing configuration settings, downloaded data and the like. Such memory unit 6 can further be split in a part accessible for the controlling appliance 2 and one part accessible for the communication unit 3.

The communication unit 3 is preferably a separate part of the wireless device 1, in a preferred embodiment implemented as machine-to-machine module (M2M module), which is formed by a PCB with the appropriate components, like a controlling unit 5, and a baseband chip, which could also be part of the controlling unit 5, like displayed in the FIG. 1. Further the communication unit has access to an identification unit 7, which is in a preferred embodiment a removable SIM or USIM card, alternatively also a non-removable implementation, in particular a solderable machine identification module (MIM) can be used. Finally an antenna 9 is connected to the wireless device 1, in particular to the communication module 3, specifically the baseband processor.

The controlling appliance controls the communication unit via a command interface 4, preferably the AT-command interface. This allows both to launch commands for getting appropriate responses, and for getting asynchronous notifications from the communication units, in the case of AT-commands in form of unsolicited result code (URCs). The asynchronous notifications and/or the responses comprising information about an event, in the case of present invention in particular about a determination step which is conducted within the communication unit 3. Preferably the controlling appliance 2 launches a command via command interface 4, telling the communication unit 3 to execute the determination steps and return the results as response and/or unsolicited result code.

Via the antenna 9 the wireless device 1 is configured to be in connection with a first base node 12a of a cellular network 10, using the air interface 15. The first base node 12a is equipped with an antenna 13a, which forms the end point of the air interface 15 with the antenna 9 of the wireless device 1. The first base node 12a is configured to serve a cell area 11a, that means wireless devices 1 located within the cell area 11a should be able to establish a connection with the first base node 12a. Hence it is called serving base node 12a.

The first base node 12a is part of a network of nodes, which are connected to the core network 14 of a mobile operator as part of the cellular network 10. The cellular network 10 comprises at least one more second base node 12b, also equipped with an antenna 13b, covering a second cell area 11b. Via the core network 14 connections to other wireless or fixed devices can be established, including a remote server 20. Such remote server 20 is preferably configured to download data from during a reception session, like a multimedia server e.g. for videos, or a server for downloading software, in particular firmware updates.

Figure 2:
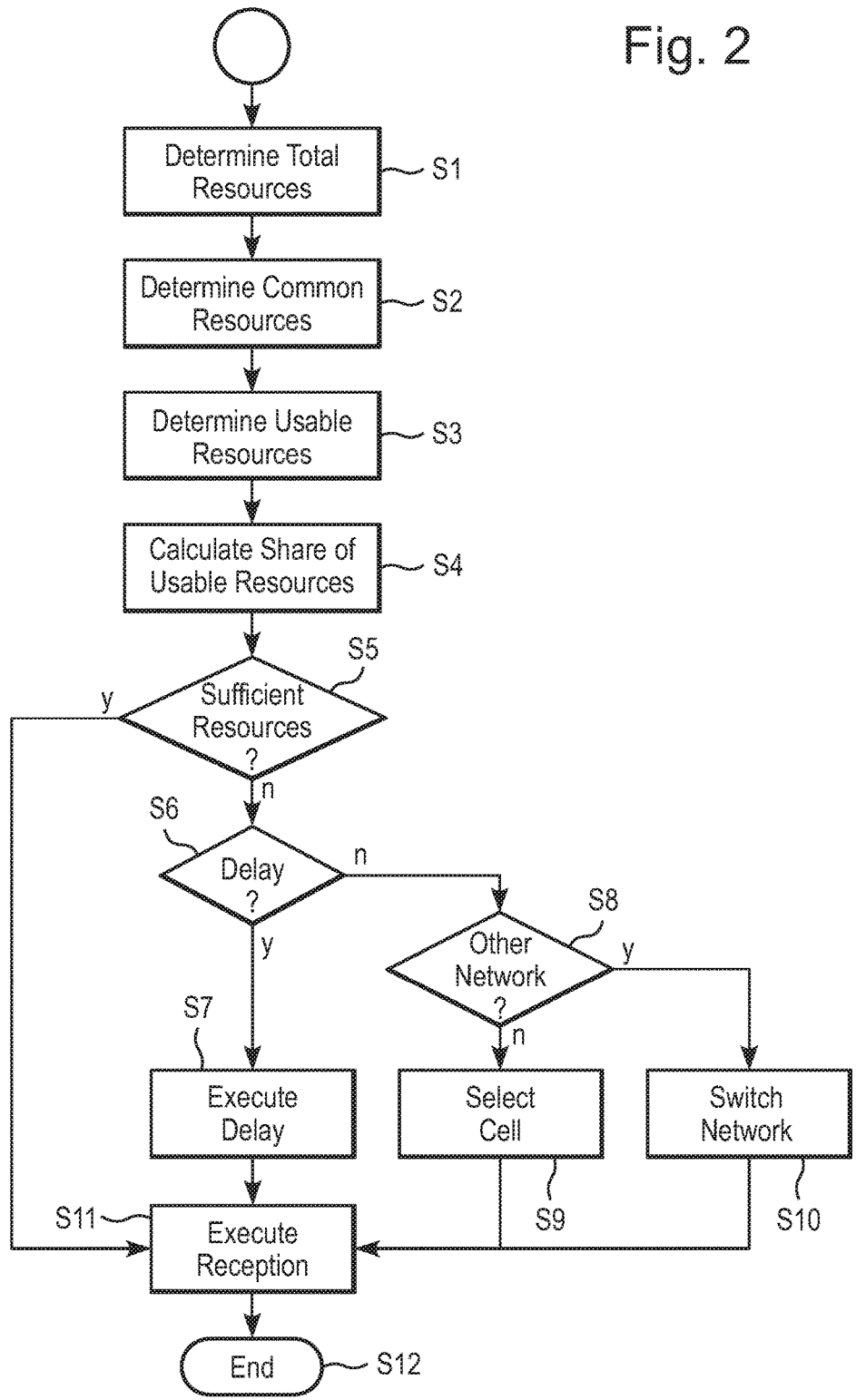
FIG. 2 shows a flowchart of a particular form of an embodiment.

FIG. 2 shows an exemplifying flow chart of operation steps according to a preferred embodiment of the invention. The steps are preferably executed in a wireless device 1, whereby some steps can be executed in different parts of the wireless device 1, in particular the controlling appliance 2 or the communication unit 3.

The method starts with the step S1 of determining the total resources available at the serving base node 12a. This step can be a measuring or a deduction of other measures. This step is followed by the steps S2 and S3, with S2 comprises the determination of common resources and S3 the determination of usable resources. It is arbitrary in which order these steps are carried out. It is advantageous but not mandatory to execute these determination steps within a short time frame.

For a 3G network these determination steps S1 to S3 comprise the measurement of power, in particular in S1 the received wideband power, in S2 the received power of the common channel and in S3 the power of received dedicated channels assigned to the wireless device 1. It is advantageous to measure these values directly with the communication unit 3 at the antenna 9. Further adjustments are preferably but not displayed in this flow charts, like determination of interferences like described above.

When the determination of steps S1 to S3 are terminated in step S4 a share of usable resources compared to total resources minus common resources are conducted. This results preferably in a percentage of the available resources.

Depending on the knowledge of current throughput it can thus be evaluated by the wireless device 1, if a planned reception can be executed in the required timeframe. If the throughput is not known it can be determined following step S3 or S4 in an additional optional step. The theoretical maximum throughput at a serving base node 12a is constant and therefore does not need to be determined each time. Depending on the wireless technology standard there are different ways to determine this maximum throughput of a base node.

Based on the now determined values the wireless device 1 can in step S5 evaluate if the currently available amount of resources is sufficient to conduct the planned reception session. For this it is preferable to know about such planned receptions. For certain receptions, like a download of a firmware, map data, multimedia file or an email, it is helpful to communicate ahead with the remote server 20, from which the data are downloaded, in order to detect the amount of data. If it is a regular download of similar size this task can even be omitted.

So, in step S5 the wireless device 1 compares the expected amount of data with the actual available share resp. throughput at the serving base node 12a and decides if the available resources are sufficient. The decision if they are sufficient can be parameterized by predefined thresholds in terms of time, share of resources, throughput amount etc. It is even advantageous if a combination of those parameters is evaluated, and the resources are only viewed as sufficient, when all parameter are below the respective thresholds.

If the amount is sufficient, the flow jumps to step S11 and the reception is executed. If not, an adaptation of the operation of the wireless device 1 needs to be conducted, preferably taking into account the reasons for the decision from step S5.

As a first option for adaptations it is preferably considered if the planned reception can be delayed. This is the case if it is not time-critical, which would be the case for reception that are bound to a fixed point in time. One reason for a fixed point in time is a network/server based staggering of data transmissions to a group of wireless devices. Apart from that typically a file downloaded from a remote server 20 is not tied to a fixed time and can be done at some time within a period of a few hours, preferably spread over a certain amount of time. This is in particular true from the perspective of the cellular network operators, which come into trouble if for a wide range of wireless devices megabytes of firmware were to be downloaded at the same point in time.

If the planned reception can be delayed, the process flow branches to step S7 and executes a delay. It is arbitrary if this is a delay by a constant or variable amount of time, or if it requires a step back to the beginning of the process until sufficient resources are detected in step S5. If the delay is only possible within a certain period, and at the end of the period still not sufficient resources are available, then the communication is considered that in step S6 it cannot be delayed anymore. If the delay solves the problem, afterwards again step S11 is entered which is the execution of the planned reception.

If the communication cannot be delayed the process flow jumps from step S6 to S8. Here it is first checked if the wireless device 1 is allowed to access cellular networks 10 of other network operators. This is in particular true if the subscription allows roaming in cellular networks 10 of other network operators. All relevant information to figure this out is preferably read from the identification unit 7.

In step S8 now it is decided based on the available information about the subscription if a switch to another network operator is executed or if within the cellular networks 10 of the current network operator—preferably the home operator—other measures are possible. Such measures are in particular a change of the cell (11a, 11b) within the same radio network (RAN), or a change of the radio network, e.g. from 3G to 4G or vice versa. It is possible that lower wireless technology standard RANs provide a better throughput due to less traffic in these radio networks, in particular as wireless devices 1 tend to stick to higher wireless technology standard RANs.

Depending on which options are available, and which are expected to render better results—also including optionally additional measurements on other cells (11a,11b), RANs or cellular networks 10—in step S8 is decided which step to take. In step S9 consequently another cell (11b), that is another serving base node (12b), is selected, optionally one being part of a different RAN. In Step S10 it is alternatively switched to another network operators' cellular network 10.

After one of the alternative steps S7, S9 or S10 is executed it can then be switched to step S11, where the planned reception is carried out. Finally the process stops in S12. When the next reception is due the process is supposed to start anew.

Figure 3:
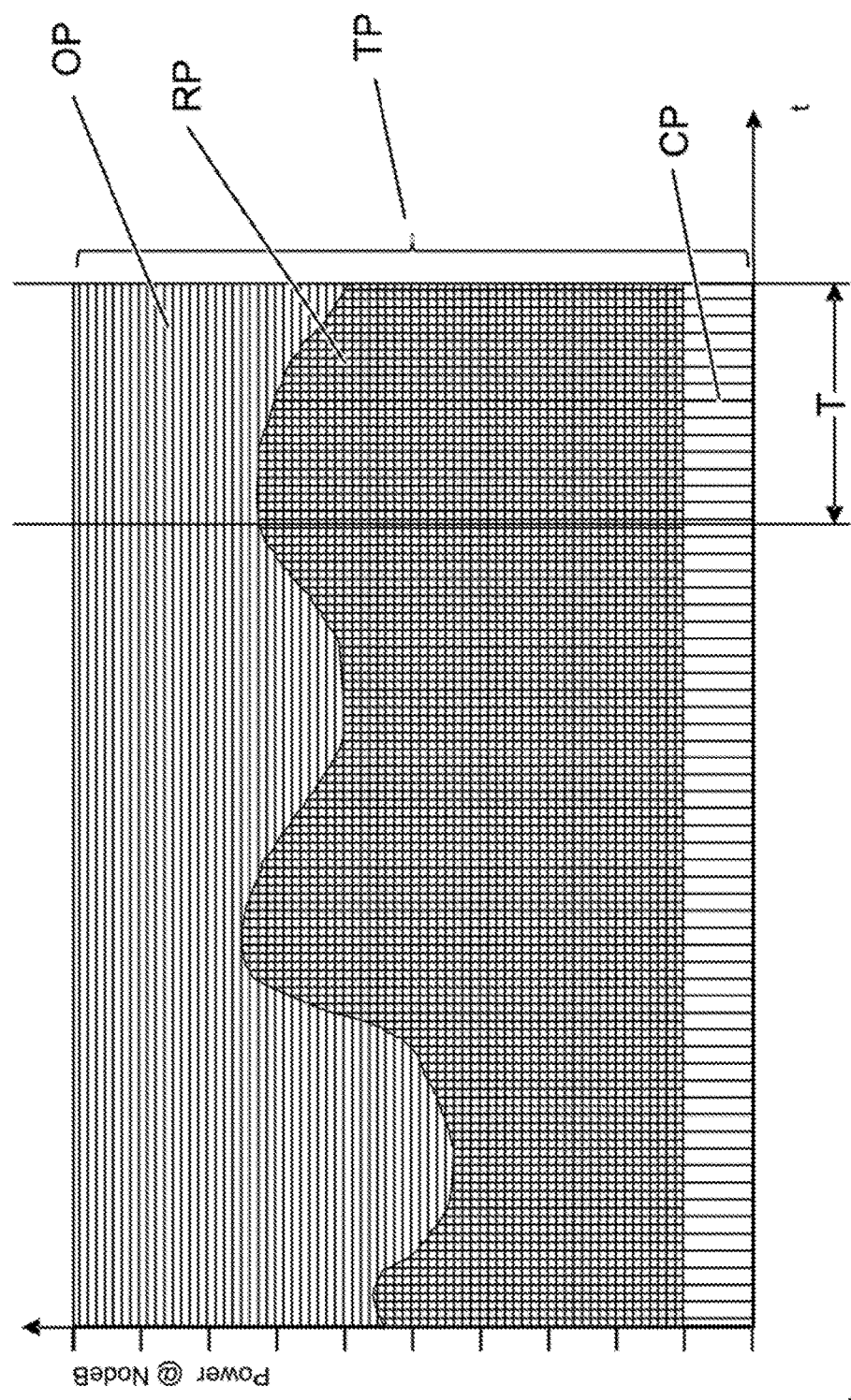
FIG. 3 shows a first diagram showing resource measurements in a frequency band at a serving base node.
Figure 4:
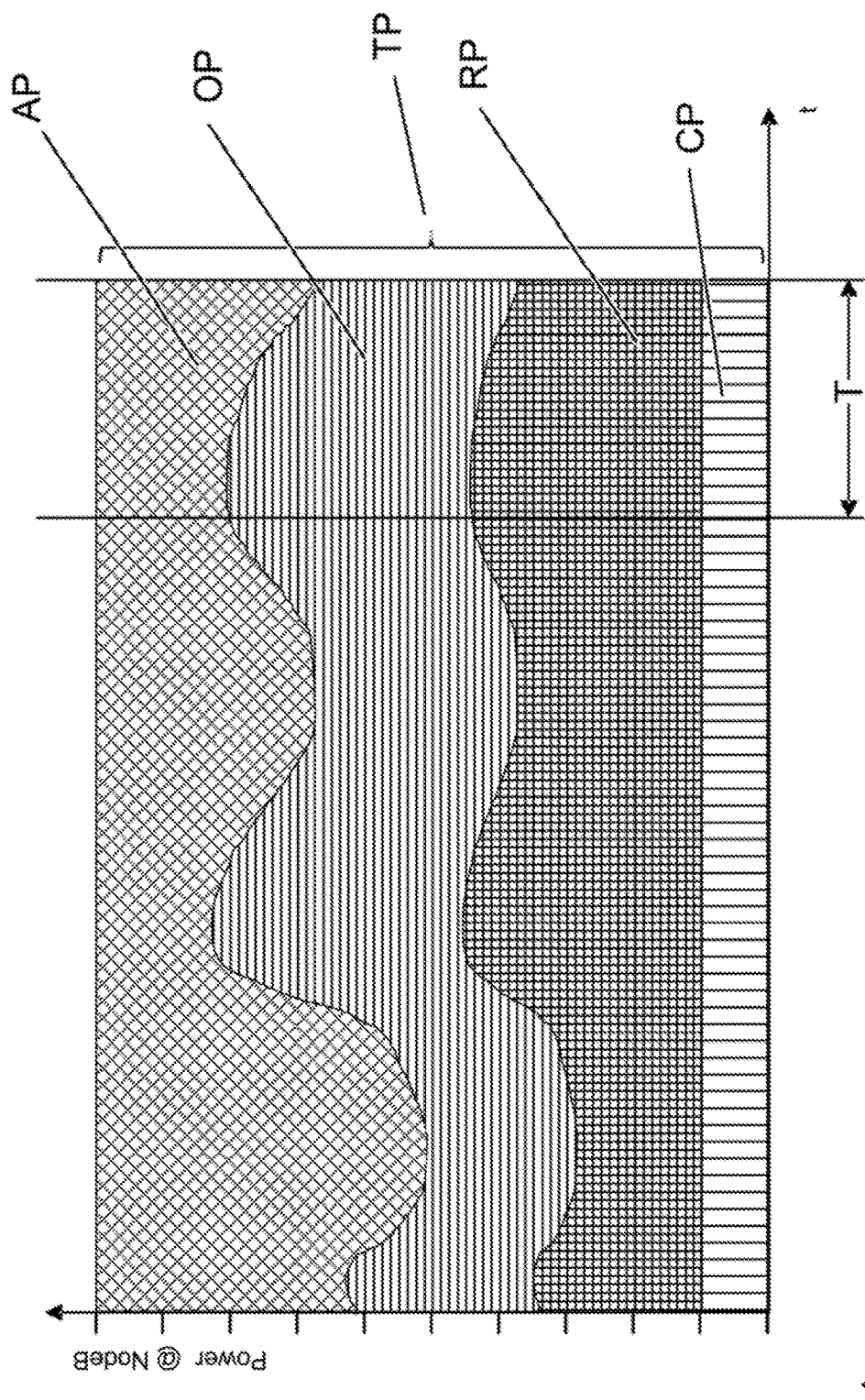
FIG. 4 shows a second diagram showing resource measurements in a frequency band at a serving base node.

FIGS. 3 and 4 show in a diagram for a 3G network the power distributions of different channels at a nodeB (which is the base node of a 3G network) in different situations. This illustrates the environment of a wireless device 1 in connection with a serving node B 12a and the different options for adaptation of the operation within the cellular network 10.

FIG. 3 shows the situation of a wireless device 1 connected to a serving nodeB 12a which is fully occupied.

On the ordinate it is visible the power at the nodeB 12a, on the abscissa it is the time. Each nodeB (12a, 12b) has a given power range, which represents the total power TP, from the wireless devices' 1 perspective this is in case of a fully occupied cell the received wideband power.

Further it is displayed the power of the common channels CP, which is a practically constant value over the time, and hence has a constant share of the total power TP. As the common channels are broadcast irrespective of the amount of wireless devices 1 decoding them, here an adaptation based on the amount of wireless devices 1 is not applicable.

Also part of the total power TP is the power of the received dedicated channels RP, named the used resources. This is for the 3G network the amount of power that the wireless device 1 receives from the serving nodeB 12a for its own receptions.

As it can be seen this amount is changing over the time, depending on the amount of requested and granted resources for communication of the wireless device 1.

Finally the total power TP comprises the power of non-common resources for other wireless devices, called other resources OP. As mentioned before, the serving nodeB 12a is totally occupied, that means no further wireless device 1 can successfully request resources as long as from the currently connected wireless devices 1 no resources are taken away.

From the perspective of a wireless device 1 the theoretically receivable full amount of power for dedicated channels is the total power TP minus the power of the common channels CP. That the serving nodeB 12a is totally occupied can be derived from the fact that the sum of used resources RP and other resource OP equals the theoretically receivable full amount of power for dedicated channels, which can be seen in FIG. 3

It is not recommended to take the power of the common channels CP into consideration for a share representing the used resources RP. Such share can now be calculated by dividing the determined amount of used resources RP through the total power TP excluding the power of the common channels CP. In the current example within the marked period T this share is decreasing, and at the end of the period it is around half of the theoretically receivable amount of power. In particular through a throughput calculation over the marked period T it can be—depending upon the calculated share—determined if the currently available amount is sufficient for the envisaged reception session.

Should this determination show that the throughput is not sufficient, it is then the question, if within this cell 11a it is possible at all to gain the required power. Currently the serving nodeB 12a is fully occupied by the wireless device 1 and other wireless devices. For the moment it is than not possible to receive more resources, therefore a delay of the reception session is advisable, if it is possible.

A further determination step is recommended, that figures out, whether the requested throughput could be received, in case the wireless device 1 received the full amount of theoretically receivable power from this serving nodeB 12a. If this is not the case, or the reception session cannot be delayed, then the wireless device 1 can take measures to adapt the operation within the current cellular network 10, in particular with the serving nodeB 12a. This is in particular the case by changing to a radio network with higher throughput rate, e.g. LTE, if applicable, or to change to another cell 11b resp. its base node 12b with higher capacity and/or less traffic than the serving nodeB 12a.

FIG. 4 shows the situation for a cell 11a which is not fully occupied. Here the same resource resp. power values appear like in FIG. 3, plus the amount of power which is available for potentially being assigned to wireless device 1, named available power AP. When in this situation the share of the used resources RP is calculated it can be seen that there is still chance to increase the amount, at max by the available power AP. Therefore the sum of used resources RP and available power AP needed to be taken into account for the decision, if the reception session will be performed within the current cell or if adaptations to the operation within the cellular network 10 need to be done.

For the situation of a non-connected wireless device 1 consequently only the available power AP needed to be taken into account, the amount of usable resources RP for the respective wireless device 1 is zero.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a wireless device operated within a cellular network, the cellular network comprising at least one radio network, comprising at least two base nodes, each base node being configured to establish a connection between the cellular network and the wireless device, the radio network further being configured to provide a channel structure comprising common channels and at least one downlink non-common channel, and a specific amount of resources available for said channels at each of the base nodes, the wireless device operating within the cellular network with resources received from one of the base nodes, hereinafter the serving base node, the wireless device being further configured to decode at least one common channel and the at least one downlink non-common channel, comprising the steps of, for the wireless device:

determining a value relative to the total amount of resources provided by the serving base node, hereinafter total resources, determining a value relative to the amount of resources provided by the serving base node for the common channels out of the total resources, hereinafter common resources, determining a value relative to the amount of resources suitable of being received by the wireless device, hereinafter usable resources, calculating the share of usable resources in comparison to said total resources excluding common resources, adapting the operation of the wireless device within the cellular network in dependence of the calculated share of usable resources.

2. Method according to claim 1
wherein the cellular network is comprising a radio network based on cellular code division multiple access method,
wherein the resources being those related to power of respective channels.

3. Method according to claim 2,
wherein the wireless device is operating in connected mode
and wherein
the step of determining total resources comprising measuring the received wideband power,
the step of determining common resources comprising determining the amount of received power of the common channel, and/or
the step of determining usable resources comprising measuring the power of received dedicated channels assigned to the wireless device.

4. Method according to claim 1
wherein the cellular network comprising a radio network being adapted for coding communication signals in a link related to the wireless device by means of an orthogonal division frequency and/or time division multiple access,
wherein the resources being those related to resource units.

5. Method according to claim 1,
wherein the cellular network comprising a radio network based on a cellular global system for mobile communications,
wherein the resources being those related to time slots.

6. Method according to claim 1,
wherein the method further comprising the step of determining data throughput of a transmission operation for a given time period (T) by calculating the usable resources compared to the total resources.

7. Method according to claim 2,
wherein the common channels comprising at least one pilot channel, wherein at the serving base node the share of resources spent for the pilot channel compared to the total resources, being practically constant around a value hereinafter designated as constant share,
the constant share further being stored within the wireless device,
wherein if the share of the resources spent for said pilot channel compared with the total resources, both resource values determined at the wireless device, materially differing from the stored constant share,
for the step of determining the value relative to the total resources: subtracting from the determined total resources a value representing the difference between the determined share and stored constant share.

8. Method according to claim 1
further comprising the steps of:
determining the amount of resources provided by the serving base node for non-common channels received at a plurality of wireless devices different from the respective wireless device, hereinafter other resources,
detecting that the resources of the serving base node being fully assigned,
if the sum of usable resources and other resources equals total resources excluding common resources,
adapting the operation of the wireless device within the cellular network further in dependence of said detecting step.

9. Method according to claim 1
wherein comparing the share of usable resources with at least one preconfigured threshold value, and if that threshold value is exceeded, taking one out of the measures for adapting operation of the wireless device:
changing radio network, or
changing serving base node within the radio network, or
delaying at least one scheduled data operation with the cellular network.

10. Wireless device configured to operate within a cellular network,
the cellular network comprising at least one radio network, comprising at least two base nodes, each base node being configured to establish a connection between the cellular network and the wireless device,
the radio network further being configured to provide a channel structure comprising common channels and at least one downlink non-common channel, and a specific amount of resources available for said channels at each of the base nodes,
the wireless device is further configured to
operate in a mode with resources received from one of the base nodes, hereinafter the serving base node, the wireless device being further configured to decode at least one common channel and the at least one downlink non-common channel,
determine a value relative to the total amount of receivable resources for the wireless device, hereinafter total resources,
determine a value relative to the amount of resources provided by the serving base node for the common channels out of the total resources, hereinafter common resources,
determine a value relative to the amount of resources suitable of being assigned to the wireless device, hereinafter usable resources,
calculate the share of usable resources in comparison to said total resources excluding common resources,
adapt the operation within the cellular network in dependence of the calculated share of usable resources.

11. Wireless device according to claim 10,
wherein the cellular network comprises a radio network based on cellular code division multiple access method
and wherein the resources are those related to power of respective channels, wherein the wireless device operates in connected mode and the step of determining total resources comprises measuring the received wideband power, the step of determining common resources comprises determining the amount of received power of the common channel, and/or the step of determining usable resources comprises measuring the power of received dedicated channels assigned to the wireless device.

12. Wireless device according to claim 10, wherein if the cellular network comprises a radio network adapted for coding communication signals in a link related to the wireless device by means of an orthogonal division frequency and/or time division multiple access, the resources are those related to resource units, and/or if the cellular network comprises a radio network based on a cellular global system for mobile communications, the resources are those related to time slots.

13. Wireless device according to claim 10, wherein the wireless device is further configured to that the step of determining data throughput of a transmission operation for a given time period comprises calculation of the usable resources compared to the total resources.

14. Wireless device according to claim 11, wherein the common channels comprise at least one pilot channel, wherein at the serving base node the share of resources spent for the pilot channel compared to the total resources is practically constant around a value hereinafter designated as constant share, the constant share is further stored within a memory unit 6 of the wireless device, wherein if the share of the resources spent for said pilot channel compared with the total resources, both resource values determined at the wireless device, materially differ from the stored constant share, for the step of determining the value relative to the total resources:

subtract from the determined total resources a value representing the difference between the determined share and stored constant share.

15. Wireless device according to claim 10, comprising a communication unit and communicatingly coupled a controlling appliance, the communication unit is configured to conduct said determination steps, and to provide results of said determination steps to the controlling appliance, the controlling appliance is configured to:

conduct said calculation step, compare the share of usable resource with at least one preconfigured threshold value, if the threshold value is exceeded conduct one out of the operations:

change radio network, or change serving base node within the radio network, or delay at least one scheduled data operation with the cellular network.

\* \* \* \* \*